(12) United States Patent
Chang et al.

(10) Patent No.: US 7,375,929 B1
(45) Date of Patent: May 20, 2008

(54) ACTUATOR INCLUDING AN ACTUATOR BODY WITH PARALLEL SUPPORT EXTENSIONS AND COIL SUPPORT TAB FOR SUPPORTING A COIL AND METHOD OF MAKING THE SAME

(75) Inventors: Ken L. Chang, Saratoga, CA (US); Kamran Oveyssi, San Jose, CA (US); Shawn E. Casey, San Jose, CA (US); Chaw-Wu Tseng, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 427 days.

(21) Appl. No.: 10/816,686

(22) Filed: Apr. 1, 2004

(51) Int. Cl.
*G11B 5/55* (2006.01)
(52) U.S. Cl. .................................. 360/265.8
(58) Field of Classification Search ............. 360/264.7, 360/265.8, 264.8, 265.7, 265, 264.2; 720/662
See application file for complete search history.

(56) References Cited

U.S. PATENT DOCUMENTS

| | | | | |
|---|---|---|---|---|
| 5,051,669 | A * | 9/1991 | Hsiao et al. ................. | 318/119 |
| 5,214,552 | A * | 5/1993 | Haga ......................... | 360/264.7 |
| 5,475,549 | A * | 12/1995 | Marder et al. ............. | 360/265.8 |
| 5,847,903 | A * | 12/1998 | Ogawa et al. ............. | 360/264.8 |
| 6,643,101 | B1 * | 11/2003 | Adams et al. ............. | 360/265.8 |
| 6,687,095 | B2 * | 2/2004 | McReynolds et al. ..... | 360/265.8 |
| 6,775,105 | B2 * | 8/2004 | Hong et al. ................ | 360/264.7 |
| 6,787,941 | B2 * | 9/2004 | Takashima .................. | 310/12 |
| 7,092,216 | B1 * | 8/2006 | Chang et al. .............. | 360/265.9 |
| 2002/0036867 | A1 * | 3/2002 | Hong et al. ................ | 360/264.7 |
| 2003/0197980 | A1 * | 10/2003 | Hong et al. ................ | 360/264.7 |
| 2005/0122628 | A1 * | 6/2005 | Hong et al. ................ | 360/256.2 |

* cited by examiner

*Primary Examiner*—Brian E. Miller
*Assistant Examiner*—Matthew G. Kayrish
(74) *Attorney, Agent, or Firm*—Stetina, Brunda, Garred & Brucker

(57) ABSTRACT

An actuator for a disk drive. The actuator includes an actuator body The actuator body includes a main body section defining a horizontal plane orthogonal to an axis of rotation. The actuator body further includes an actuator arm extending from the main body section. The actuator body further includes two parallel support extensions extending from the main body section opposite the actuator arm. The support extensions cooperatively form a channel between the support extensions. The actuator body further includes a coil support tab disposed adjacent the support extensions and extending orthogonal to the horizontal plane. The actuator further includes a vertical coil defining a coil plane disposed orthogonal to the horizontal plane. The coil is disposed in mechanical communication with the support extensions and the coil support tab for supporting the coil within the channel.

17 Claims, 3 Drawing Sheets

ACTUATOR INCLUDING AN ACTUATOR BODY WITH PARALLEL SUPPORT EXTENSIONS AND COIL SUPPORT TAB FOR SUPPORTING A COIL AND METHOD OF MAKING THE SAME

BACKGROUND OF THE INVENTION

1. Field of the Invention

The present invention relates generally to disk drives, and in particular to a disk drive including an actuator including an actuator body with parallel support extensions and coil support tab for supporting a coil and method of making the same.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base and supports a lowermost one of the disks. The head stack assembly has an actuator assembly having at least one air bearing slider, typically several, for reading and writing data from and to the disk. Each slider includes a transducer head for reading and writing data. The printed circuit board assembly includes a servo control system in the form of a disk controller for generating servo control signals. The head stack assembly is controllably positioned in response to generated servo control signals from the disk controller. In so doing, the attached sliders are controllably moved relative to tracks disposed upon the disk for reading and writing operations.

The head stack assembly includes an actuator assembly, at least one head gimbal assembly, and a flex circuit assembly. A conventional "rotary" or "swing-type" actuator assembly typically includes an actuator having an actuator body. The actuator body is configured to rotate on a pivot assembly between limited positions about an axis of rotation. One or more actuator arms extend from one opposite side of the actuator body. A head gimbal assembly is distally attached to each of the actuator arms. A head gimbal assembly includes an air bearing slider that is attached to a suspension with a gimbal. The suspension resiliently supports the air bearing slider above the tracks of the disk during operation of the disk drive facilitating the slider to "fly" above the disk.

A coil is supported by a coil support that extends from an opposite side of the actuator body. The coil is configured to interact with one or more permanent magnets to form a voice coil motor. The coil is disposed in electrical communication with the disk controller through a flex circuit assembly. Controlled movement of the head stack assembly is achieved by selectively energizing the coil with the generated servo control signals.

The actuator arms are usually formed of aluminum which may be machined from a single piece of material. The actuator body is typically takes the form of plastic overmold disposed about the actuator arms. The plastic overmold may additionally be used to form the coil support. As can be appreciated, a reduction in the complexity of manufacturability and assembly with respect to the actuator would represent an improved actuator configuration in comparison to the prior art.

SUMMARY OF THE INVENTION

According to an aspect of the present invention, there is provided an actuator for a disk drive. The actuator includes an actuator body. The actuator body includes a main body section defining a horizontal plane orthogonal to an axis of rotation. The actuator body further includes an actuator arm extending from the main body section. The actuator body further includes two parallel support extensions extending from the main body section opposite the actuator arm. The support extensions cooperatively form a channel between the support extensions. The actuator body further includes a coil support tab disposed adjacent the support extensions and extending orthogonal to the horizontal plane. The actuator further includes a vertical coil defining a coil plane disposed orthogonal to the horizontal plane. The coil is disposed in mechanical communication with the support extensions and the coil support tab for supporting the coil within the channel.

According to various embodiments, the actuator body may be formed of a single integrated piece of material. The actuator body may be formed of a stamped material. the actuator body may be formed of a sheet metal material. The coil support tab may extend from the main body section. The coil support tab may be disposed between the support extensions. The coil support tab may be bent from a position between the support extensions within the horizontal plane. The coil may include a pair of opposing primary legs and pair of opposing secondary legs respectively disposed between the primary legs. A respective one of the primary legs is disposed in mechanical communication with the support extensions within the channel, and a respective one of the secondary legs is disposed in mechanical communication with the coil support tab. The respective one of the secondary legs may include a radially exterior surface disposed in mechanical communication with coil support tab. The primary legs may be longer than the secondary legs. The coil may be attached to the coil support tab. The coil may be attached to the coil support tab with an adhesive. The coil may be attached to the support extensions. The coil may be attached to the support extensions with an adhesive. The support extensions may extend from the main body section along the horizontal plane.

According to another aspect of the present invention there is provided a disk drive. The disk drive includes a disk drive base and an actuator rotatably coupled to the disk drive base. The actuator is as described above.

According to yet another aspect of the present invention, there is provided a method of manufacturing an actuator for a disk drive. The method includes providing an actuator body. The actuator body includes a main body section defining a horizontal plane orthogonal to an axis of rotation. The actuator body further includes an actuator arm extending from the main body section. The actuator body further includes two parallel support extensions extending from the main body section opposite the actuator arm. The support extensions cooperatively form a channel between the support extensions. The actuator body further includes a coil support tab portion disposed adjacent the support extensions. The method further includes bending the coil support tab portion to be orthogonal to the horizontal plane to form a coil support tab. The method further includes attaching a vertical coil to the actuator body. The vertical coil defines a coil plane disposed orthogonal to the horizontal plane. The coil is disposed in mechanical communication with the support extensions and the coil support tab for supporting the coil within the channel.

The providing of the actuator body may include stamping the actuator body from a sheet material. The actuator body may be formed of a single integrated piece of material. The main body section may be integrally formed with the coil support tab portion. The vertical coil may be attached to the actuator body with an adhesive.

DESCRIPTION OF THE PREFERRED EMBODIMENTS

Figure 1:
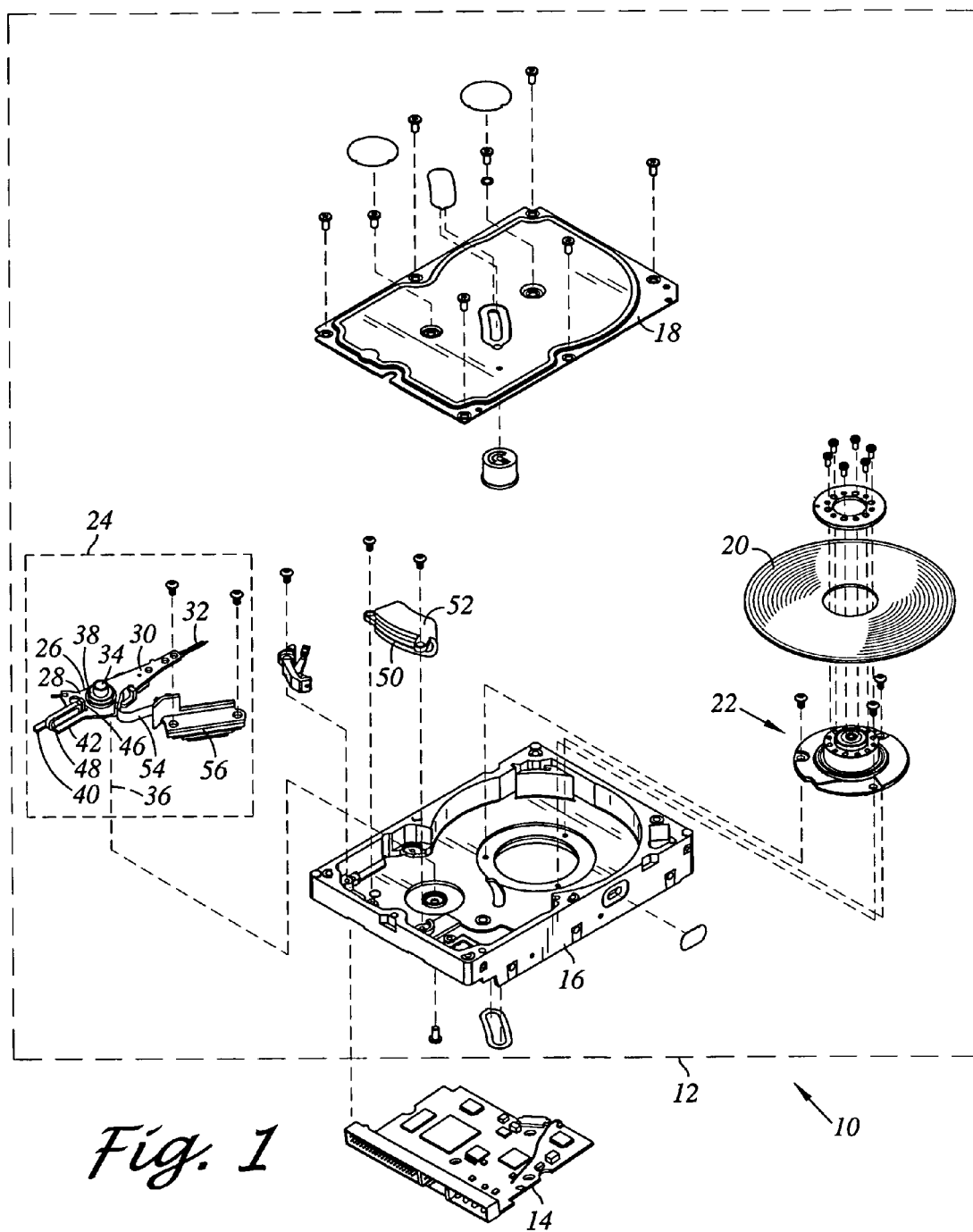
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1-7 illustrate an actuator and a disk drive in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a magnetic disk 20. The disk 20 contains a plurality of tracks for storing data. The head disk assembly 12 further includes a spindle motor 22 for rotating the disk 20. The head disk assembly 12 further includes a head stack assembly 24 rotatably attached to the disk drive base 16 in operable communication with the disk 20. The head stack assembly 24 includes a rotary actuator 26.

The actuator 26 includes an actuator body 28 and an actuator arm 30 that extends from the actuator body 28. It is contemplated that additional actuator arms 30 may be provided. Distally attached to the actuator arm 30 is a head gimbal assembly 32. The head gimbal assembly 32 includes a slider. The slider includes a transducer head. The actuator body 28 includes a bore, and the actuator 26 further includes a pivot bearing cartridge 34 engaged within the bore for facilitating the actuator body 28 to rotate between limited positions about an axis of rotation 36.

Figure 2:
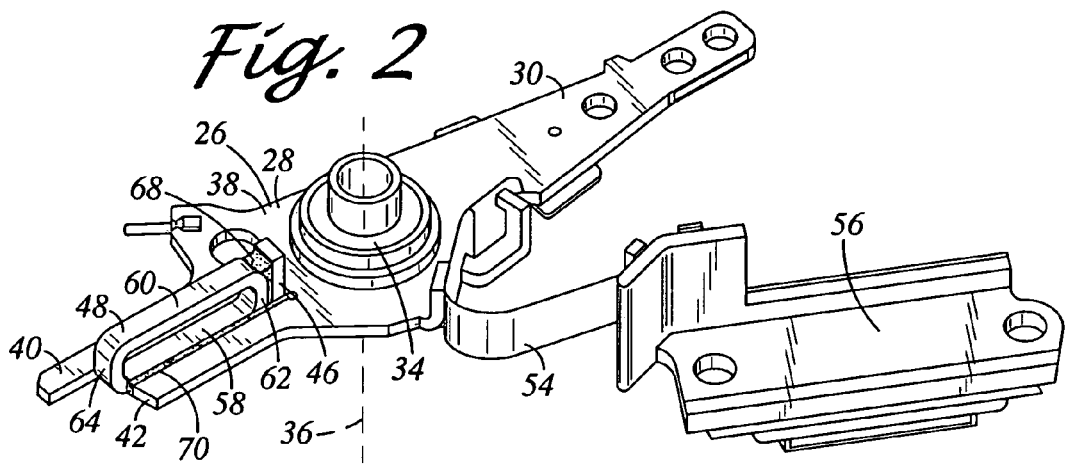
FIG. 2 is an enlarged perspective view of a head stack assembly including an actuator of FIG. 1.
Figure 3:
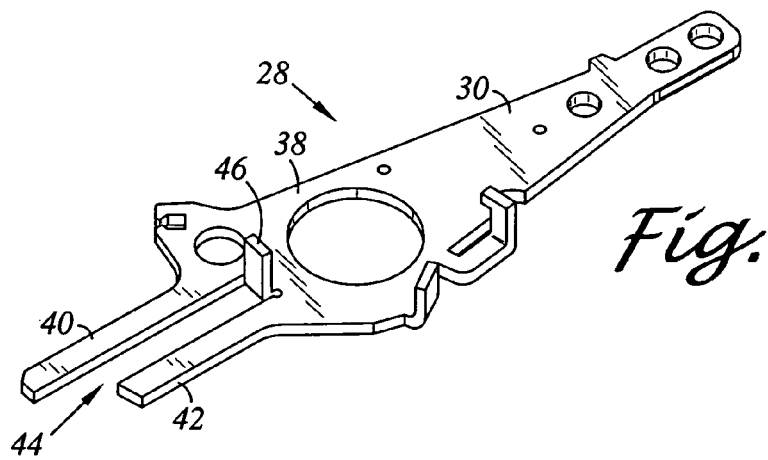
FIG. 3 is a perspective view of an actuator body of FIG. 2.
Figure 4:
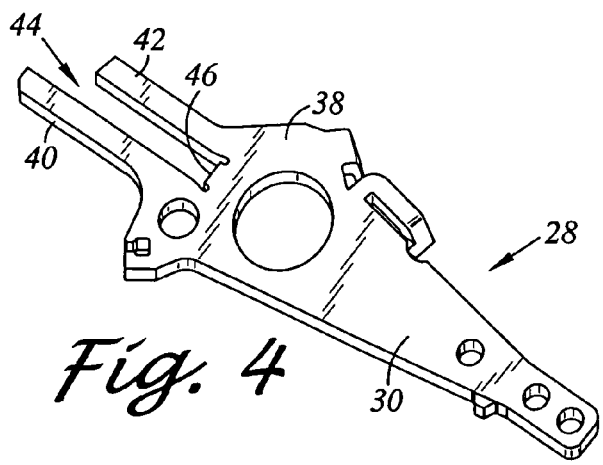
FIG. 4 is a bottom perspective view of the actuator body of FIG. 3.

Shown in FIG. 2 is an enlarged perspective view of the head stack assembly 24 including the actuator 26 of FIG. 1. FIG. 3 is a perspective view of an actuator body 28 of FIG. 2 and FIG. 4 is a bottom perspective view of the actuator body 28 of FIG. 3.

According to an aspect of the present invention, there is provided the actuator 26 for the disk drive 10. The actuator 26 includes the actuator body 28. The actuator body 28 includes a main body section 38 defining a horizontal plane orthogonal to the axis of rotation 36. The actuator body 28 further includes the actuator arm 30 extending from the main body section 38. The actuator body 28 further includes two parallel support extensions 40, 42 extending from the main body section 38 opposite the actuator arm 30. The support extensions 40, 42 cooperatively form a channel 44 between the support extensions 40, 42. The actuator body 28 further includes a coil support tab 46 disposed adjacent the support extensions 40, 42 and extending orthogonal to the horizontal plane. The actuator 26 further includes a vertical coil 48 defining a coil plane disposed orthogonal to the horizontal plane. The coil 48 is disposed in mechanical communication with the support extensions 40, 42 and the coil support tab 46 for supporting the coil 48 within the channel 44.

In the embodiment shown, the actuator body 28 may be formed of a single integrated piece of material. Further, the actuator body 28 may be formed of a stamped material. In this embodiment, it is contemplated that the actuator body 28 is relatively simple to manufacture as it is formed of an integrated stamped material. Preferably the actuator body 28 is formed of a sheet metal material. This may take the form of rolled aluminum sheet material. As used herein the term stamped refers to a manufacturing process which is well known to one of ordinary skill in the art and involves the deformation of material from a generally flat piece of material. This is in contrast to such other processes such as machining which is relative more complex and therefore a relatively more costly process. It is contemplated that the actuator body 28 may be formed through other processes which may be chosen from those well know to one of ordinary skill in the art, such as machining. To the extent multiple actuator arms 30 may be required. In which case the actuator arms 30 may be machined from a single piece of materials or separately stamped and then adhesively bonded, mechanically swaged, laser welded or plastic overmolded for examples.

The head stack assembly 24 further includes a flex circuit assembly 54 and a cable connector 56. The cable connector 56 is attached to the disk drive base 16 and is disposed in electrical communication with the printed circuit board 14. The flex circuit assembly 54 supplies current to the actuator coil 48 and carries signals between the transducer head and the printed circuit board assembly 14.

Figure 5:
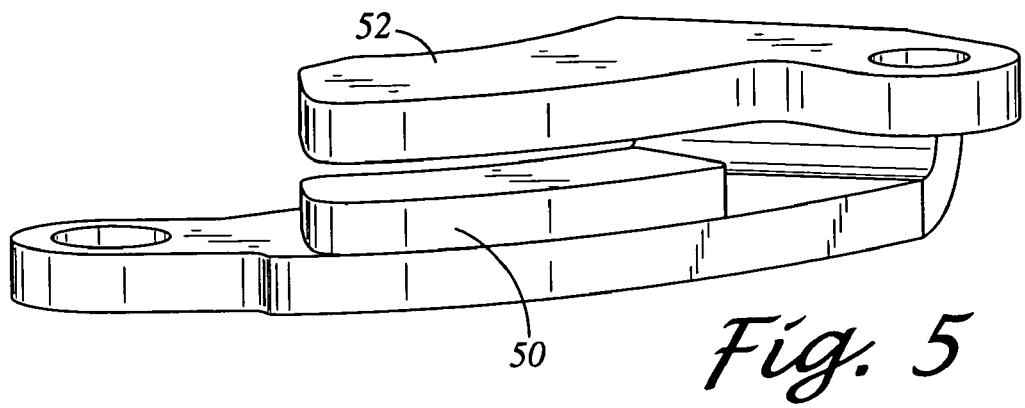
FIG. 5 is an enlarged perspective view of the voice coil motor yoke of FIG. 1.
Figure 6:
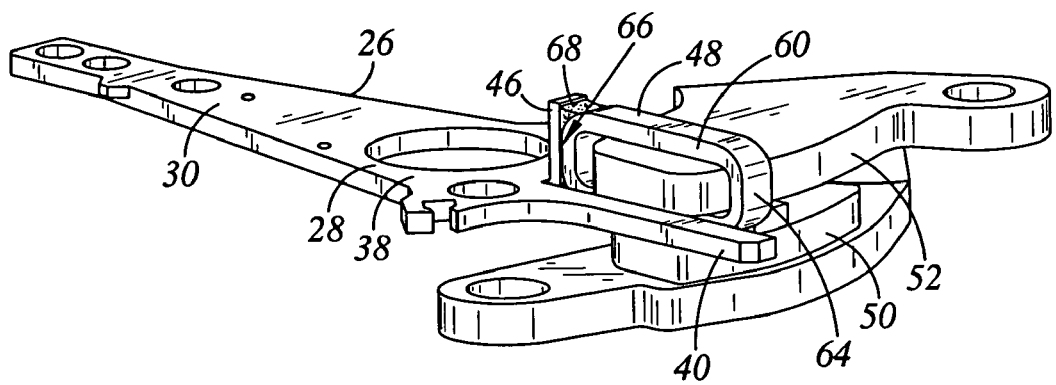
FIG. 6 is a perspective view of the actuator shown in relation to a voice coil motor yoke of FIG. 5.

As additionally seen in FIGS. 5 and 6, a voice coil magnet 50 is supported by a yoke 52 which is coupled to the disk drive base 16. The coil 48 interacts with the magnet 50 to form a voice coil motor for controllably rotating the actuator 26. In the embodiment shown, the yoke 52 is generally c-shaped, however, other configurations of the yoke 52 may be chosen from those which are well known to one of ordinary skill in the art.

In the embodiment shown, the coil support tab 46 extends from the main body section 38. The coil support tab 46 may be integrally formed with the main body section 38. Though not shown it is contemplated that the coil support tab 46 may extend from other portions of the actuator body 28 such as from a selected one to the support extensions 40, 42. The coil support tab 46 may be disposed between the support extensions 40, 42 as shown. Further, the coil support tab 46 may be bent from a position between the support extensions 40, 42 within the horizontal plane. As will be appreciated, this facilitates a relatively simple manufacturing process as is discussed further below. In this respect, the support extensions 40, 42 may extend from the main body section 38 along the horizontal plane. Similarly, the actuator arm 30 may extend from the main body section 38 along the horizontal plane. As such, in the embodiment shown, the support extensions 40, 42, the actuator arm 30, and the main body section 38 all lie in a common horizontal plane. This configuration lends itself to being manufactured via a relatively efficient stamping process where only a single actuator arm 30 is desired.

The coil 48 may include a pair of opposing primary legs 58, 60 and a pair of opposing secondary legs 62, 64 respectively disposed between the primary legs 58, 60. The primary legs 58, 60 may be longer than the secondary legs 62, 64. The coil 48, the voice coil magnet 50, and the yoke 52 are sized and configured to produce the desired magnetic properties according to those techniques which are well known to one of ordinary skill in the art.

In the embodiment shown, the primary leg 58 is disposed in mechanical communication with the support extensions 40, 42 within the channel 44, and the secondary leg 62 is disposed in mechanical communication with the coil support tab 46. The secondary leg 62 may include a radially exterior surface 66 disposed in mechanical communication with coil support tab 46. The coil 48 may be attached to the coil support tab 46. The coil 48 may be attached to the coil support tab 46 with an adhesive 68 as seen in FIG. 2. Further, the coil 48 may be attached to the support extensions 40, 42. The coil 48 may be attached to the support extensions 40, 42 with an adhesive 70 as seen in FIG. 2.

As will be appreciated, the coil 48 is securely positioned within the channel 44. In this regard, the support extensions 40, 42 restrain the coil 48 from moving laterally with respect to a longitudinal axis of the actuator body 28. Further, with the coil support tab 46 extending from the main body portion 38 as shown, the coil 48 is restrained from moving longitudinally. The use of the adhesive 68, the coil support tab 46 facilitates restraint of the coil 48 from moving vertically in a direction along the axis of rotation 36. The adhesive 70 further aids in this function. Moreover, it is contemplated that the coil support tab 46 restrains the coil 48 from rotational movements with respect to the actuator body 28. The coil support tab 46 is contemplated to facilitate the overall support and secure retention of the coil 46 with respect to the actuator body 28. Such design lends itself to a relatively simple stamping and bending manufacturing process. Thus, this configuration allows for the secure attachment of the coil 48 while avoiding relatively complex manufacturing and assembly processes such as associated with the use of overmold plastic to fix the coil 48 in place or any additional parts such as a clip or fastener.

According to an aspect of the present invention, there is provided the disk drive 10. The disk drive 10 includes the disk drive base 16 and the actuator 26 rotatably coupled to the disk drive base 16. The actuator 26 is as described above.

Figure 7:
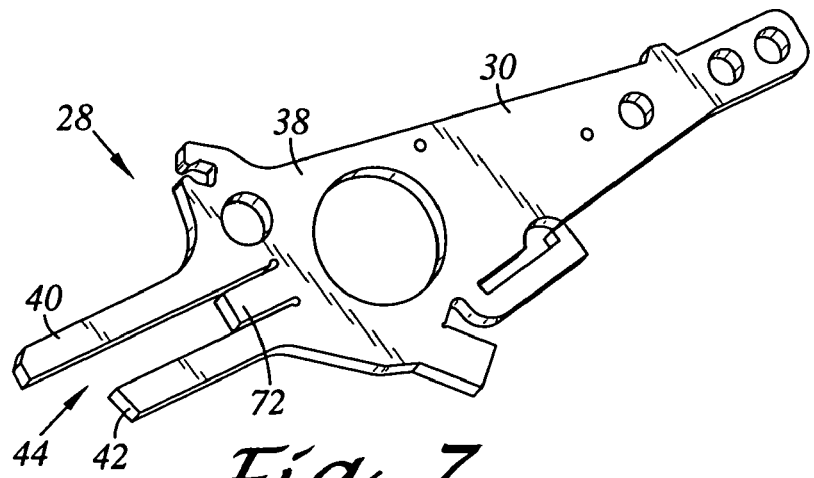
FIG. 7 is a perspective view of the actuator body prior to being completely formed.

According to another aspect of the present invention, there is provided a method of manufacturing the actuator 26 for the disk drive 10. Referring now to FIG. 7, the method includes stamping the integrated actuator body 28 from a sheet material. The actuator body 28 includes the main body section 38 defining the horizontal plane orthogonal to an axis of rotation 36. The actuator body 28 further includes the actuator arm 30 extending from the main body section 38. The actuator body 28 further includes the two parallel support extensions 40, 42 extending from the main body section 38 opposite the actuator arm 30. The support extensions 40, 42 cooperatively form the channel 44 between the support extensions 40, 42. The actuator body 28 further includes a coil support tab portion 72 disposed adjacent the support extensions 40, 42.

Referring now to FIG. 3, the method further includes bending the coil support tab portion 72 to be orthogonal to the horizontal plane to form the coil support tab 46. The method further includes attaching the vertical coil 48 to the actuator body 28. The vertical coil 48 defines a coil plane disposed orthogonal to the horizontal plane. The coil 48 is disposed in mechanical communication with the support extensions 40, 42 and the coil support tab 46 for supporting the coil 48 within the channel 44.

While the coil support tab 46 is depicted as being bent upward from a horizontal position, it is contemplated that the coil support tab 46 may be bent downward as well. The vertical coil 48 may be attached to the actuator body with an adhesive, such as the adhesives 68, 70.

We claim:

1. An actuator for a disk drive, the actuator comprising:
   an actuator body including:
      a main body section defining a horizontal plane orthogonal to an axis of rotation;
      an actuator arm extending from the main body section;
      two parallel support extensions extending from the main body section opposite the actuator arm, the support extensions cooperatively forming a channel between the support extensions; and
      a coil support tab disposed adjacent the support extensions and extending orthogonal to the horizontal plane; and
   a vertical coil defining a radially exterior surface and a coil plane disposed orthogonal to the horizontal plane, the coil being disposed in mechanical communication with the support extensions and the coil support tab for supporting the coil within the channel, the radially exterior surface being disposed in mechanical communication with the coil support tab.

2. The actuator of claim 1 wherein the actuator body is formed of a single integrated piece of material.

3. The actuator of claim 1 wherein the coil support tab is integrally formed with the main body section.

4. The actuator of claim 1 wherein the actuator body is formed of a stamped material.

5. The actuator of claim 1 wherein the actuator body is formed of a sheet metal material.

6. The actuator of claim 1 wherein the coil support tab extends from the main body section.

7. The actuator of claim 1 wherein the coil support tab is disposed between the support extensions.

8. The actuator of claim 1 wherein the coil support tab is bent from a position between the support extensions within the horizontal plane.

9. The actuator of claim 8 wherein the primary legs are longer than the secondary legs.

10. The actuator of claim 1 wherein the coil includes a pair of opposing primary legs and pair of opposing secondary legs respectively disposed between the primary legs, a respective one of the primary legs is disposed in mechanical communication with the support extensions within the channel, a respective one of the secondary legs is disposed in mechanical communication with the coil support tab.

11. The actuator of claim 10 wherein the respective one of the secondary legs includes the radially exterior surface disposed in mechanical communication with the coil support tab.

12. The actuator of claim 1 wherein the coil is attached to the coil support tab.

13. The actuator of claim 12 wherein the coil is attached to the coil support tab with an adhesive.

14. The actuator of claim 1 wherein the coil is attached to the support extensions.

15. The actuator of claim 14 wherein the coil is attached to the support extensions with an adhesive.

16. The actuator of claim 1 wherein the support extensions extend from the main body section along the horizontal plane.

17. A disk drive comprising:
- a disk drive base; and
- an actuator rotatably coupled to the disk drive base, the actuator including:
  - an actuator body formed of an integrated stamped material, the actuator body including:
    - a main body section defining a horizontal plane orthogonal to an axis of rotation;
    - an actuator arm extending from the main body section;
    - two parallel support extensions extending from the main body section opposite the actuator arm, the support extensions cooperatively forming a channel between the support extensions; and
    - a coil support tab disposed adjacent the support extensions and extending orthogonal to the horizontal plane; and
  - a vertical coil defining a radially exterior surface and a coil plane disposed orthogonal to the horizontal plane, the coil being disposed in mechanical communication with the support extensions and the coil support tab for supporting the coil within the channel, the radially exterior surface being disposed in mechanical communication with the coil support tab.

* * * * *